May 8, 1934.  J. P. KELLY  1,957,653
ELECTROPNEUMATIC BRAKING SYSTEM
Filed July 13, 1928    3 Sheets-Sheet 2
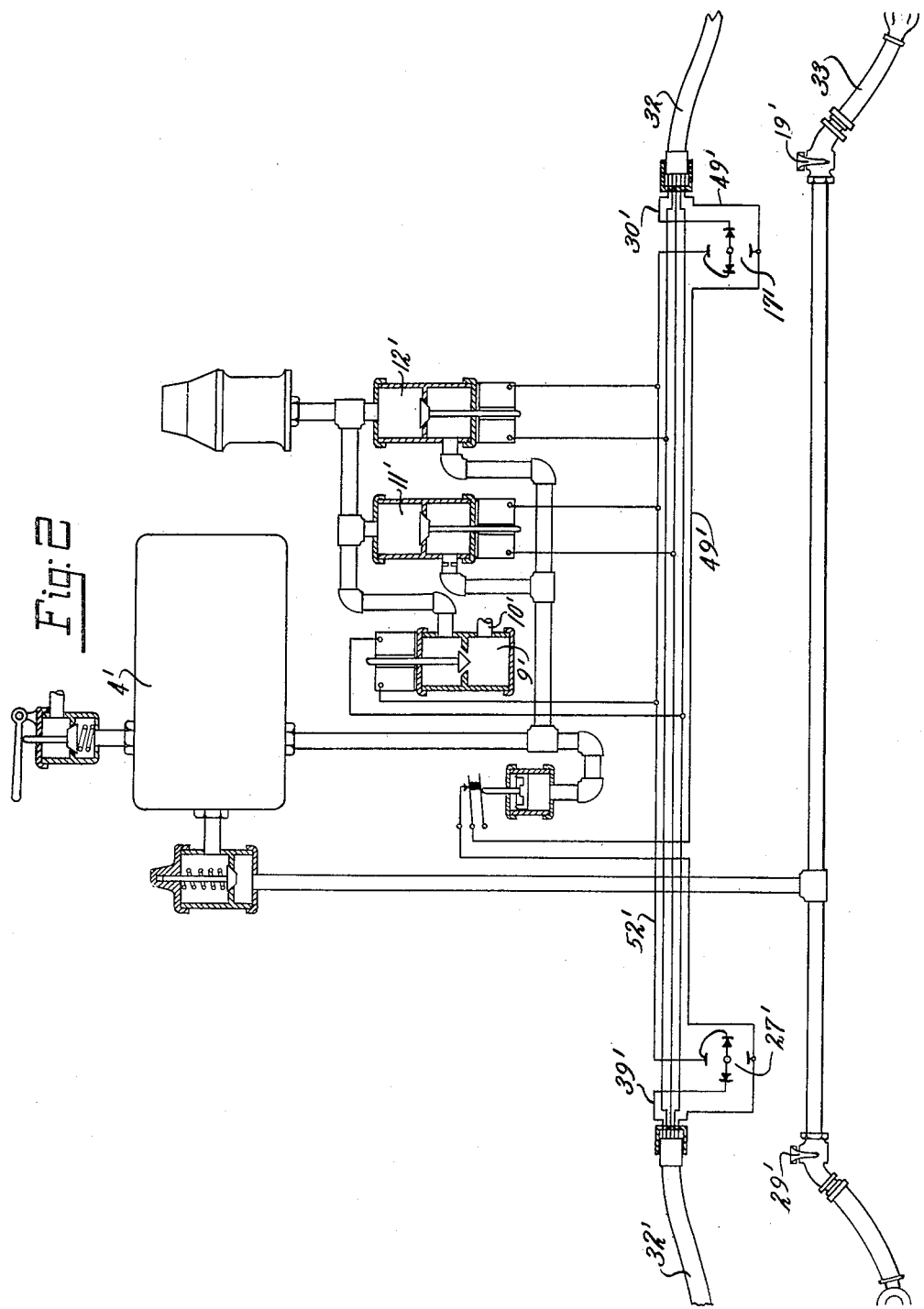
Inventor
John P. Kelly
Wm Walter Owen Atty.

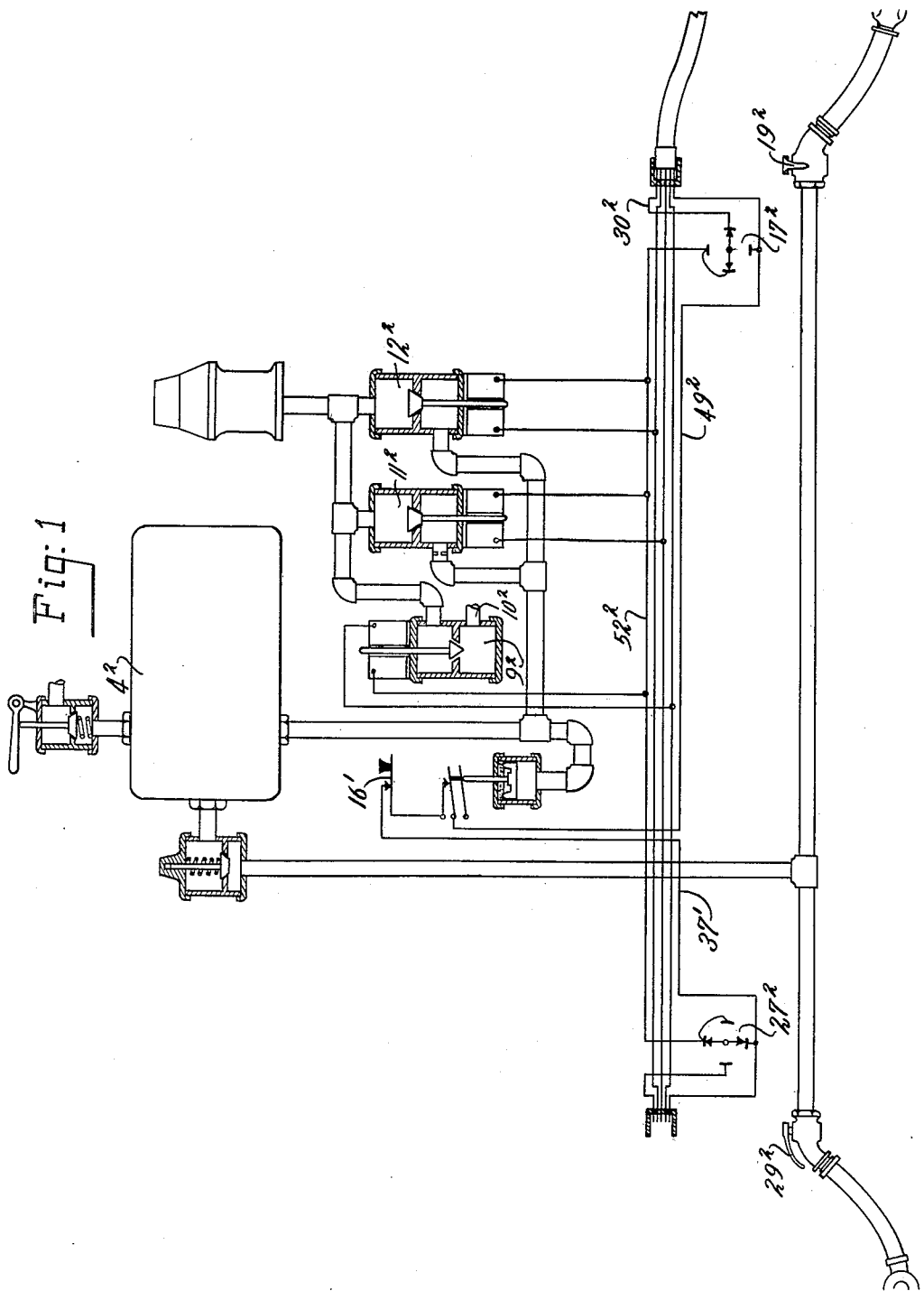

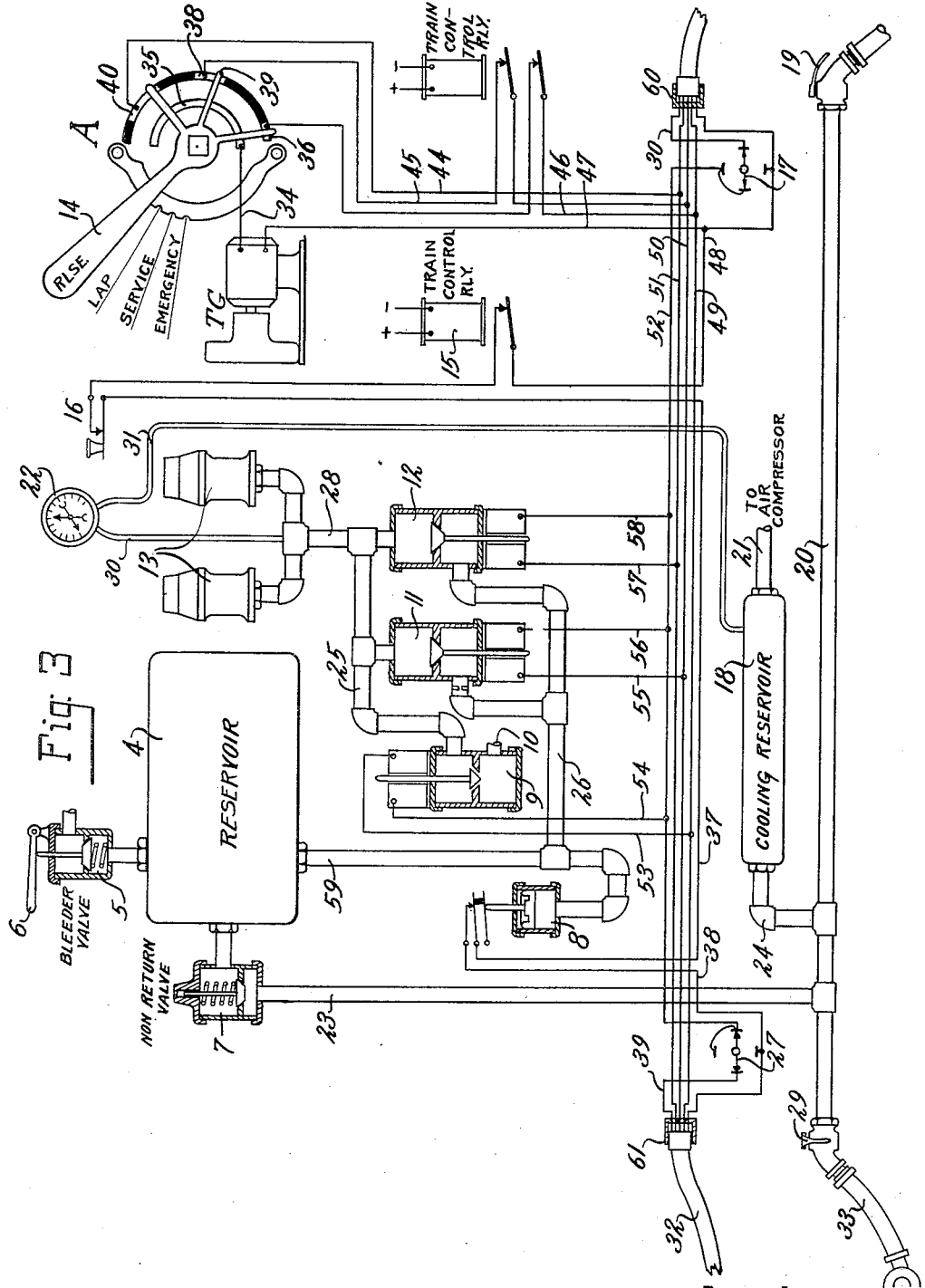

Patented May 8, 1934

1,957,653

UNITED STATES PATENT OFFICE 1,957,653

ELECTROPNEUMATIC BRAKING SYSTEM

John P. Kelly, Pittsfield, Mass., assignor, by mesne assignments, to Associated Electric Laboratories, Inc., Chicago Ill., a corporation of Delaware Application July 13, 1928, Serial No. 292,575

2 Claims. (Cl. 303—20)

The present invention relates in general to braking systems, but is particularly concerned with the design of an electropneumatic air brake system primarily for use on railroad vehicles, both steam and electric, but which may also be used to advantage on automobiles of the heavier type.

The objects of the invention are: first, to arrange the compressed air system in such a manner that it is constantly being charged and maintained at the required pressure so that a full pressure application may be made at any time; second, to provide a system wherein the brake application is instantaneous and simultaneous through the whole train, and release of such application may be as quickly and frequently made as conditions demand; third, to provide a system which is always under perfect control and wherein the exact degree of brake application desired for proper control of the train may be made under any condition without the necessity for any previous manual adjustment of taps or valvular parts; fourth, to provide a system wherein no detrimental effects result due to air leakages so long as they are less than the capacity of the compressor which supplies the system with air; fifth, to provide a system wherein triple control valves, pressure reducing valves, pressure retaining valves, etc., such as are necessary with the well known braking system now generally used and which cause erratic actions of the system, such as undesired emergency brake applications, sticking brakes, non-uniformity of brakes under pressure due to variable piston travel, loss of air in applying the brakes and severe train shocks are unnecessary; sixth, to provide a system wherein perfect graduation of brake cylinder pressure may be made, enabling the highest degree of safety and efficiency in the motion of all classes of trains on grades of any length and on any percentage of incline, without the necessity of requiring the use of hand brakes or the manipulation of any valve corresponding to the present pressure retaining valve; seventh, to provide a system wherein testing of the brakes is facilitated to cause the brakes, when applied, to remain applied regardless of brake cylinder leakage until an inspector can complete his work and obtain knowledge of the exact condition of the brake apparatus; eighth, to provide a system wherein the brakes may be applied or released at any time irrespective of the type, length of, or speed of the train, without danger of breaking the train in two, or injury to cars, due to buckling of the train, or the danger of internal collision of the separated parts should the train break in two; ninth, to provide a system wherein stops can be made with smoothness and precision regardless of the number of cars in the train and with large economy in time when making stops, particularly water tank stops; uniformity of brake cylinder pressure regardless of variable piston travel; tenth, to provide a system wherein the cylinder pressure is not dependent on the operation of any valve actuated by a differential in pressure, and wherein a variable piston travel does not affect the uniformity of operation thereby, thus preventing the sliding and overheating of wheels experienced with the system now in general use; eleventh, to provide a system wherein perfect control of the train while backing into terminal stations or into sidings etc., may be placed in the hands of conductors and flag men; twelfth, to provide a system wherein telephonic or other known types of communication between the conductor and engineman of either freight or passenger trains may be readily provided by utilizing conductors used in the control of the braking system and by the same means also providing circuits for use in electrically lighting the cabooses of freight trains; thirteenth, to provide a system wherein the closure of the brake supply pipe at any point in the train will not prevent manual application of the brake when desired, and will result in an automatic brake application as soon as a limited amount of pressure drop occurs in the section cut off; fourteenth, to provide a system wherein the brakes may be manipulated by either engineman when double heading and wherein they may be applied from any passenger vehicle or from a caboose if an emergency arises; fifteenth, to provide a system wherein the air supplied for Pullman water raising systems and for any compressed air device may be taken off the brake supply pipe at any point of the train without in any way detrimentally affecting the operation of the brake system; sixteenth, to provide a system wherein so long as the electric circuits are in operative condition and the air pressure ample to properly control the train, the brakes may be manipulated as desired and when these conditions do not exist, the brake application is automatically made, making it impossible for a train to start out unless it is first placed under perfect control of the engineman and conductor; seventeenth, and to provide a system wherein various other features of advantage not mentioned, but which will be brought out as the description continues.

The invention is diagrammatically disclosed in three sheets of drawings designated Figs. 1, 2, and 3, which, when placed adjacent each other with Fig. 1 at the left and Fig. 3 at the right of Fig. 2 diagrammatically illustrate the braking system applied to a train comprising an engine and two cars. The various parts shown in Fig. 1 and Fig. 2 are duplicates of the corresponding parts shown in Fig. 3 and therefore a description of the apparatus comprising the locomotive equipment, shown in Fig. 3, will suffice.

The electrical equipment of the locomotive in the main consists of: a turbo generator TG to supply the necessary current; of a brake applicator A having an operating handle 14 with circuit making and breaking contactors; of a series of solenoid magnet valves 11, 12, and 9, namely, a service application valve, an emergency application valve, and a brake cylinder exhaust valve; of the required junction equipment 32 for connecting the electrical circuits of the locomotive and other vehicles of the train together; of a low pressure circuit breaker 8; of electric circuit hand switches 16 and 16'; and of the necessary wiring to complete the various circuits of the apparatus used.

The compressed air equipment in the main consists of: an air compressor (not shown), which may be steam, electrical, or axle driven, to supply compressed air at the required pressure for use in the brake cylinders; of a supply pipe 20 running throughout the entire length of the locomotive; of a cooling reservoir 18; of a brake cylinder storage reservoir 4; of the required brake cylinders 13, for each vehicle; of the previously referred to electropneumatic valves to control the application and release of air to and from the brake cylinders; of a non-return check valve 7, located between the supply pipes 20, 23 and the storage reservoir, of a bleeder valve 5 for the storage reservoir 4, and of the necessary hose connections 33, angle cocks 19, 29, and couplings to complete the system.

The turbo generator TG, it should be understood, is provided for supplying current to the electrical equipment of the locomotive and to all vehicles of the train. However, only those circuits extending therefrom having to do with the present invention are shown. The brake applicator, having a handle 14 for controlling electrical circuits of the electrical equipment, is provided to take the place of the well known manually operable pneumatic brake applicators generally used, and controls the circuits of the various electropneumatic valves.

The electrical equipment of each vehicle is connected to the equipment of the adjacent vehicle by means of a suitable jumper 32 inserted into a jack 61, while the switch 27 or 17 at each end of the vehicle has its contacting wiper manually placed in a vertical or horizontal position dependent upon whether the vehicle is the first, last, or some intermediate one of the train.

Where the equipment is provided on a locomotive, passenger vehicle, or a caboose, a contact operating button 16 is provided. This is used by a conductor for applying the brakes in emergencies of which the engineman may not be aware, and by the following engineman should the emergency arise, in case of double heading.

The electropneumatic valves 11, 12, and 9 and the valves corresponding to these on each vehicle have one terminal of their windings connected to a common current supply conductor corresponding to 52 via leads corresponding to leads 54, 56, and 58. This common conductor is supplied with current from the negative terminal of the turbo generator TG only if one of the switches of the locomotive has its wiper set vertically, if the locomotive is running alone, or if at the head of a train when switch 27 has its wiper in a horizontal position and a following vehicle, properly the last of the train, has its rear switch, 27, in its vertical position.

When the engine is running alone either switch 17 or 27 or both may be in vertical position but the switch 17 of the locomotive is usually only in vertical position when being towed in reverse direction with its brakes under control of another locomotive. In most cases, however, the switch 17 is left in horizontal position.

The switches 17 and 27 of all intermediate vehicles must also have their wipers in their horizontal position. With all the switches such as 17 and 27 in the positions specified, namely, all in horizontal position except the last switch $27^2$, and with all low pressure circuit breakers 8 of the train in closed circuit, current from the negative terminal of the turbo generator TG will be supplied to all of the electropneumatic valves of the train, via conductors 47, 48, contacts of the train control relay 15, if auto-train control has been provided, the button operated auxiliary brake control contacts 16, conductor 37, contacts of the low pressure circuit breaker 8, and the conductor 38 terminating in the jack 61. Since in the present illustration the train consists of a locomotive, a freight vehicle and a passenger vehicle or caboose, the circuit is continued through the jumper 32, conductor 49', jumper 32', conductor $49^2$, the contacts controlled by button 16', conductor 37', wiper of switch $27^2$ in its vertical position to the conductor $52^2$, wiper of the switch $17^2$ in its horizontal position, jumper 32', conductor 39', wiper of the switch 27', in its horizontal position to the conductor 52', wiper of the switch 17', in its horizontal position, conductor 30', jumper 32, conductor 39, and the wiper of switch 27 in its horizontal position to the conductor 52.

The positive current supply lead to the valve of each vehicle corresponding to the service application electropneumatic valve 11 of Fig. 3 extends from the positive terminal of the turbo generator TG to the arc 35, through bridging member 39, segment 38, the conductors 45, 50 and thence to conductor 55 extending to the winding of the electropneumatic valve 11. The conductor 50 is one of several extending directly through the entire train via the jumpers 32 and, therefore, the corresponding magnet of each of the other vehicles will also be energized.

The positive current supply lead for the emergency electropneumatic valve 12 and all other valves corresponding to it are energized over a second circuit similar to that traced for the magnet valve 11, except that the circuit is over segment 40, and conductors 44, 51, and 57 and like conductors on the other vehicles.

The positive current supply lead for the brake exhaust electropneumatic valve 9, and all magnets corresponding to this one, extends over a third circuit similar to those traced for magnets 11 and 12, except that it includes segment 36, and the conductors 46, 49, and 53.

The air compressor continuously supplies air to one or more cooling reservoirs such as 18, which, via piping 24 supplies air to the line 20. The air supplied passes through the pipe 23, through the non-return valve 7 into the reservoir 4. Attached to the reservoir 4 is a pipe connection 59 leading to the low pressure circuit breaker 8, and a branch 26 extends to the electropneumatic service brake applying valve 11, and the electropneumatic emergency brake applying valve 12. The supply ports of these valves are connected with a common brake cylinder pipe 28 connected with the brake cylinders 13 and also with a gauge 22. This gauge, through the medium of a pipe connection 31 is also connected with the main source of air supply at the cooling reservoir 18 and is designed to indicate both brake pipe and brake cylinder pressure.

A branch 25 of the piping running to the brake cylinders is also connected with the electropneumatic brake exhaust valve 9, the exhaust port 10 the outlet of which leads to atmosphere.

The bleeder valve 5, having a manually operable handle 6, is connected with the reservoir 4 to enable the air pressure to be exhausted from the brake reservoir as is the usual practice in switching. The brake pipe line 20, by means of standard couplers 33, is extended to all vehicles of the train so that the air equipment corresponding to that just described will be supplied to all vehicles.

It is believed that the invention will be best understood by describing the manner in which the various parts function under various circumstances to be assumed.

I will assume that the train has just been made up and preparation is being made for a run. Before a train can leave the yards precautions must be taken to see that all angle cocks 19—19² and 29—29² and all switches 17—17² and 27—27² are in the appropriate positions. The air compressor is then started and compressed air is pumped into reservoir 18, from which it passes out over the brake line 20 and through the non-return valve 7, into the braking reservoir 4 and to all corresponding equipment on the remaining vehicles. From this point the air passes through the pipe 59 into the low pressure circuit breaker 8 and into the service and emergency electropneumatic valve units 11 and 12 and into the corresponding units of each other vehicle.

Since at this time little or no pressure exists in the chambers of the low pressure circuit breakers 8 the common or negative supply lead, formerly traced for the electropneumatic units 9, 11, and 12, will be open at the low pressure breaker of each vehicle. Since this is a chain circuit none of these magnets can become energized until a certain specified pressure in each of the brake supply reservoirs has been built up. Therefore the air supplied to the electropneumatic valves 11 and 12 will lift the valves off their seats and pass directly into the braking cylinders of the vehicles. Hence, from the foregoing, it will be seen that with the air compressor operating and no electrical energy in the magnet operating circuits, the brakes of the various vehicles of the train will be applied direct, or pumped on, by the compressor, and none of them can be released until the switches 17—17² and 27—27² are properly set and the pressure in each low pressure circuit breaker has built up sufficiently to close its point in the chain circuit. If there is no excessive leakage the pressure will eventually be raised sufficiently to operate the low pressure circuit breaker contacts on all vehicles and when this occurs the previously traced circuits for the electropneumatic valves 9, 11, and 12 and for the corresponding valves of each vehicle will be completed. It follows therefore that when all the apparatus is in working order the brake exhaust electropneumatic valve 9 and all others corresponding to it, will be energized to connect the brake cylinder exhaust with atmosphere, permitting the brakes to release, while the service and emergency electropneumatic valves 11 and 12 of each vehicle will be energized to prevent air from escaping therethrough to the associated brake cylinders.

It will be recalled that the circuits of the respective groups of brake exhaust, service and emergency electropneumatic valve magnets pass through the respective segments 36, 38 and 40 of the applicator A. These segments are so proportioned that when the handle 14 is moved to "lap" position the circuit for the brake exhaust magnet valves is broken; when the handle 14 is moved to "service" position the circuit of the service brake magnets is also broken; and that when the handle is moved to "emergency" position the circuits of all three groups of magnets are broken.

In the well known and generally used braking system of today, the engineer moves the applicator lever, corresponding to 14, into the service or the emergency position until a desired brake pipe reduction in pressure has been made after which the lever is returned to lap position. This same procedure with respect to handle movement is followed in this system.

When it is desired to make a service application of the brakes the engineman or motorman, as the case may be, moves the control handle 14 to service position. In this position the circuits for the service application magnets 11—11² and the one for the brake cylinder exhaust magnets 9—9² are broken. These magnets therefore become de-energized and air may now flow from the storage reservoirs 4—4² to the brake cylinders 13—13² forming pressure therein which, through the medium of the braking gear, forces the brake shoes against the wheels. The brake cylinder exhaust valves are held seated by the brake cylinder pressure so that the air cannot escape. When sufficient pressure has been obtained in the cylinders to meet the requirements the controller handle 14 is returned to lap position, causing the service application magnets to again become energized and close their service ports. The brake cylinder exhaust magnets, however, remain de-energized and hence the exhaust ports remain closed holding the brakes applied. If now the engineman wishes to graduate the brakes off he does so by simply turning the controller handle 14 to release position for a moment and then returning it back to the lap position. If he wishes to increase the cylinder pressure he moves the controller handle to the service application position again until he has obtained the desired amount of increase in pressure and then again returns it to lap position. The effect of these operations is, of course, simultaneous and instantaneous on the equipment of each part of the train.

If it is desired to obtain an emergency application, the controller handle 14 is moved to the emergency position. This breaks the circuit of and causes all of the magnet valves to become deenergized. Consequently air from the storage reservoir and from the source of air supply flows rapidly to the brake cylinders and develops therein a pressure equal to that initially in the storage reservoirs. The emergency application may be graduated off in the same manner as just explained for the service application.

In case the conductor of a freight train wishes to stop the train he may do so by operating the button 16' in his caboose. A passenger conductor or trainman may do so by operating the button 16' in any car of the train.

In backing up operations, the brake applications may be controlled by the conductor in the caboose or rear coach in case it is a passenger train by actuating the button 16'. This interrupts the common circuit through which current is supplied to all of the electropneumatic valves and therefore deenergizes the brake cylinder exhaust, service and emergency electropneumatic valves. Owing to the high speed at which these valves may be energized and deenergized a graduation of brake application may be accomplished by intermittently operating the button 16', so that the train may be brought to a stop in the terminal under perfect control.

In the case of double heading the brake applicator lever 14 of the rear locomotive is moved to release position in which it is preferably locked or the handle removed so as to guard against the engineer of the second locomotive inadvertently removing control of the train from the engineer of the head locomotive, as it will readily be seen, since the conductors 48-52 will be multiplied through the head locomotive the head engineer will be unable to break the circuit of the electropneumatic valves while the second locomotive applicator lever 14 is in release position. He can, however, in such an emergency, control the brakes by operating his button 16.

This button, however, is provided primarily for use by the engineman of the following locomotive for, in an emergency which might arise, bringing about a brake application, in the same manner as accomplished by the conductor.

It will be noted that unlike the system in general use, air is constantly supplied to the reservoirs 4—4² so that it is unnecessary for the engineer to resort to cycling on long down grades to refill the reservoirs and the brakes may therefore be continuously applied with the desired degree of force and held so applied so long as the locomotive compressor is of sufficient capacity to take care of all leakage.

In case a train, due to defective drawbar equipment or for some other reason, breaks in two while the train is in motion, the severing of a jumper connection will immediately break the circuit for all of the electropneumatic valve equipment of both sections, since the common current supply leads 37 and 52 are both severed, and therefore the entire train will be brought to a stop. Since the brake application in this instance like in all others is simultaneous and instantaneous because loss of reservoir and brake cylinder air in case of a train breaking in two is prevented by the non-return check valve there will be no danger of internal collision of the separated parts as sometimes occurs in the type of system now generally used.

Since in this system a number of conductors extend from the locomotive to the rear vehicle telephone equipment or other types of signalling apparatus may readily be applied to the system to enable communication to be had at all times between the engineer and the conductor. This is very desirable as a great amount of time is often lost in the manual signalling between the engineer and conductor especially in the operation of long freight trains where the caboose may be entirely out of sight of the engineer and no air signalling system is provided.

To guard against the solenoids freezing and sticking in cold weather they are so designed that the heating action of the current flow therethrough will prevent freezing and they therefore operate dependably in cold as well as in warm climates.

In case of accidental or malicious closure of the brake supply pipe at any point of the train an automatic brake application of the entire train will occur as soon as leakage in the cut off portion of the train has become sufficient to cause any one of the low pressure circuit breakers to open the circuit of the common current supply. If no leakage occurs the defect will be found after a sufficient number of brake applications have been made to reduce the pressure below that required to hold the pressure contacts closed, and will have to be corrected before the train can proceed.

The relays 30 and 15 are shown merely to illustrate the manner in which either an automatic service or emergency brake application may be controlled by a train control system.

From the foregoing it will be appreciated that the present system is so designed that so long as the electrical circuits are in operative condition and the air supply adequate the system will function under perfect control of the engineer or conductor, but when any fault arises, it will be readily detected by an automatic application of the brakes or by the failure of the brakes to release following an application.

What is claimed is:

1. In an electropneumatic brake, the combination with a brake cylinder and an associated supply of compressed air, of a pair of magnetically operable valves connected in multiplied air paths extending between said cylinder and supply of compressed air, a third magnetically operable valve in an air path extending from said cylinder to atmosphere, means for energizing all of said valves to hold the brakes released, for deenergizing one of the pair of valves and the third valve to produce one degree of brake application, to deenergize all of said valves to produce a greater degree of brake application, and to reenergize the said pair of valves to maintain a brake application in lap condition.

2. In an electropneumatic brake, the combination with a brake cylinder and an associated compressed air supply, of a set of electrically operable valves, a direct air path extending from said cylinder to atmosphere completed by the energization of one of said valves, a direct path between said cylinder and said compressed air supply blocked by the energization of a second one of said valves, and a second direct path between said cylinder and air supply blocked by the energization of a third of said valves.

JOHN P. KELLY.